(12) United States Patent
Liu et al.

(10) Patent No.: US 11,138,466 B2
(45) Date of Patent: Oct. 5, 2021

(54) IMAGE PROCESSING METHOD, PROCESSING APPARATUS AND PROCESSING DEVICE

(71) Applicant: BOE TECHNOLOGY GROUP CO., LTD., Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 254 days.

(21) Appl. No.: 16/338,830

(22) PCT Filed: Aug. 20, 2018

(86) PCT No.: PCT/CN2018/101372
§ 371 (c)(1),
(2) Date: Apr. 2, 2019

(87) PCT Pub. No.: WO2019/091181
PCT Pub. Date: May 16, 2019

(65) Prior Publication Data
US 2020/0065619 A1 Feb. 27, 2020

(30) Foreign Application Priority Data
Nov. 9, 2017 (CN) .......................... 201711099143.2

(51) Int. Cl.
*G06K 9/62* (2006.01)
*G06N 3/04* (2006.01)
*G06N 3/08* (2006.01)

(52) U.S. Cl.
CPC ......... *G06K 9/6256* (2013.01); *G06K 9/6234* (2013.01); *G06K 9/6265* (2013.01); *G06N 3/0454* (2013.01); *G06N 3/08* (2013.01)

(58) Field of Classification Search
None
See application file for complete search history.

(56) References Cited

U.S. PATENT DOCUMENTS

2016/0125572 A1 5/2016 Yoo et al.
2018/0260975 A1* 9/2018 Sunkavalli ................ G06T 7/00
(Continued)

FOREIGN PATENT DOCUMENTS

CN 106952224 A 7/2017
CN 106971202 A 7/2017
(Continued)

OTHER PUBLICATIONS

Chinese Office Action dated May 20, 2019.
(Continued)

*Primary Examiner* — David Perlman
(74) *Attorney, Agent, or Firm* — Dilworth & Barrese, LLP.; Michael J. Musella, Esq.

(57) ABSTRACT

An image processing method includes: obtaining an input image; performing image conversion processing on the input image by using a generative neural network; and outputting an output image that has been subjected to image conversion processing. The input image has N channels, N being a positive integer greater than or equal to 1; input of the generative neural network includes a noise image channel and N channels of the input image; output of the generative neural network is an output image including N channels.

18 Claims, 7 Drawing Sheets

(56) References Cited

U.S. PATENT DOCUMENTS

2019/0057520 A1* 2/2019 Cinnamon .............. G06T 9/002
2019/0080205 A1* 3/2019 Kaufhold ............. G06K 9/6257

FOREIGN PATENT DOCUMENTS

| CN | 107122826 A | 9/2017 |
|----|-------------|--------|
| CN | 107180410 A | 9/2017 |
| CN | 107767408 A | 3/2018 |

OTHER PUBLICATIONS

International Search Report and Written Opinion dated Nov. 14, 2018 from State Intellectual Property Office of the P.R. China.
Gatys et al., "A Neural Algorithm of Artistic Style", Journal, Aug. 26, 2015.
Li et al., "Laplancian-Steered Neural Style Transfer", Journal, Jul. 30, 2017, p. 1-9, Association for Computing Machinery.
Zhu et al., "Unpaired_Image-To-Image Translation using Cycle-Consistent Adversarial-Networks", Journal, p. 2223-2232, Berkeley AI Research (BAIR) laboratory, UC Berkley, Nov. 15, 2018.
Johnson et al. "Perceptual Losses for Real-Time Style Transfer and Super-Resolution", Journal, Deptartment of Computer Science, Stanford University, Mar. 27, 2016.
Xun Huang et al: "Arbitrary Style Transfer in Real-time with Adaptive Instance Normalization"; Department of Computer Science & Cornell Tech, Cornell University; Mar. 20, 2017.
Gatys et al., "A Neural Algorithm of Artistic Style", Journal, Journal of Vision, vol. 16, No. 12, Sep. 1, 2016, pp. 1-16, XP055571235.
Yongcheng Jing et al: "Neural Style Transfer: A Review"; ARXIV.org, Cornell University Library; May 11, 2017.
Extended European Search Report issued by the European Patent Office for the corresponding European Patent Application No. 18876474.0 dated Jun. 25, 2021.

* cited by examiner

IMAGE PROCESSING METHOD, PROCESSING APPARATUS AND PROCESSING DEVICE

This application claims the priority of Chinese Patent Application No. 201711099143.2, filed on Nov. 9, 2017, which is hereby incorporated by reference in its entirety as a part of this application.

TECHNICAL FIELD

The present disclosure relates to the field of image processing, and more particularly to an image processing method, a processing apparatus and a processing device.

BACKGROUND

The use of deep neural network for image processing and conversion is a technique that has emerged with the development of deep learning technique. However, the image processing and conversion system in the prior art has complicated structure and is difficult to train, and the output image lacks diversity. Accordingly, there is a need for an image processing method, a processing apparatus and a processing device for implementing image conversion, which can ensure consistency between the output image and the input image, and also achieve diversity between different output images.

SUMMARY

An embodiment of the present disclosure provides an image processing method, comprising: obtaining an input image; performing image conversion processing on the input image by using a generative neural network, according to the input image and a noise image; and outputting an output image that has been subjected to image conversion processing, wherein the generative neural network is obtained by training based on a content loss function.

According to an embodiment of the present disclosure, the input image has N channels, N being a positive integer greater than or equal to 1; input of the generative neural network includes a noise image channel and N channels of the input image; output of the generative neural network is an output image including N channels.

According to an embodiment of the present disclosure, the generative neural network includes one or more downsampling modules, one or more residual modules and one or more upsampling modules.

According to an embodiment of the present disclosure, the downsampling module includes a convolution layer, a downsampling layer and an instance normalizing layer that are connected in sequence; the residual module includes a convolution layer and an instance normalizing layer that are connected in sequence; the upsampling module includes an upsampling layer, an instance normalizing layer and a convolution layer that are connected in sequence, wherein the number of the upsampling module is equal to the number of the downsampling module.

According to an embodiment of the present disclosure, the input image serves as a first training image, the noise image serves as a first training noise image, and the output image serves as a first output image, the image processing method further comprises: obtaining a second training noise image; generating, by using the generative neural network, a second output image according to the first training image and the second training noise image; and training the generative neural network based on the first training image, the first output image and the second output image.

According to an embodiment of the present disclosure, training the generative neural network comprises: inputting the first output image to a discriminative neural network, for outputting a discriminative tag for whether the first output image has a conversion feature; and calculating, by using a first loss calculation unit, a loss value of the generative neural network according to the first training image, the first output image, the second output image and the discriminative tag, and optimizing parameters of the generative neural network.

According to an embodiment of the present disclosure, the first loss calculation unit includes an analysis network, a first loss calculator and an optimizer, and calculating, by using the first loss calculation unit, a loss value of the generative neural network comprises: outputting, by using the analysis network, content features of the first training image, the first output image and the second output image; calculating, by using the first loss calculator, the loss value of the generative neural network in accordance with a first loss function and according to content features outputted by the analysis network and the discriminative tag of the first output image; and optimizing, by using the optimizer, parameters of the generative neural network based on the loss value of the generative neural network.

According to an embodiment of the present disclosure, the first loss function includes a content loss function, and calculating the loss value of the generative neural network comprises: calculating, by using the first loss calculator, a content loss value of the generative neural network in accordance with the content loss function and according to content features of the first training image, the first output image and the second output image.

According to an embodiment of the present disclosure, the first loss function further includes a result diversity loss function, and calculating the loss value of the generative neural network comprises: calculating, by using the first loss calculator, a result diversity loss value of the generative neural network in accordance with the result diversity loss function and according to content features of the first output image and content features of the second output image.

According to an embodiment of the present disclosure, the first output image serves as a first sample image, and the image processing method further comprises: obtaining a second sample image from a data set; identifying, by using the discriminative neural network, whether the first sample image and the second sample image have conversion features, and outputting discriminative tags; training, by using a second loss calculation unit, the discriminative neural network according to the discriminative tags, wherein the second loss calculation unit includes a second loss calculator and an optimizer, and training the discriminative neural network by using the second loss calculation unit comprises: calculating, by using the second loss calculator, a loss value of the discriminative neural network according to a discriminative tag of the first sample image and a discriminative tag of the second sample image and in accordance with a second loss function, the second loss function including a discriminative neural network loss function; and optimizing, by using the optimizer, parameters of the discriminative neural network according to the loss value of the discriminative neural network.

An embodiment of the present disclosure further provides an image processing apparatus, comprising: a generative neural network module configured to perform image conversion processing on an input image, so as to output an output image that has been subjected to image conversion processing, wherein the generative neural network module is obtained by training based on a content loss function.

According to an embodiment of the present disclosure, the input image has N channels, N being a positive integer greater than or equal to 1; input of the generative neural network includes a noise image channel and N channels of the input image; output of the generative neural network is an output image including N channels.

According to an embodiment of the present disclosure, the generative neural network includes one or more downsampling modules, one or more residual modules and one or more upsampling modules, wherein the downsampling module includes a convolution layer, a downsampling layer and an instance normalizing layer that are connected in sequence; the residual module includes a convolution layer and an instance normalizing layer that are connected in sequence; the upsampling module includes an upsampling layer, an instance normalizing layer and a convolution layer that are connected in sequence, wherein the number of the upsampling module is equal to the number of the downsampling module.

According to an embodiment of the present disclosure, the image processing apparatus further comprising: a training neural network module configured to train the generative neural network module according to the output image of the generative neural network module, wherein the input image serves as a first training image, the noise image serves as a first training noise image, and the output image serves as a first output image: the generative neural network module further generates a second output image according to the first training image and the second training noise image; the training neural network module trains the generative neural network module based on the first training image, the first output image and the second output image.

According to an embodiment of the present disclosure, the training neural network module comprises: a discriminative neural network module configured to output a discriminative tag for whether the first training output image has a conversion feature; and a first loss calculation unit configured to calculate a loss value of the generative neural network module according to the first training image, the first output image, the second output image and the discriminative tag, and optimize parameters of the generative neural network module, wherein the first loss calculation unit comprises: an analysis network configured to output content features of the first training image, the first output image and the second output image; a first loss calculator configured to calculate a loss value of the generative neural network module according to content features outputted by the analysis network and the discriminative tag of the first output image and in accordance with a first loss function; and an optimizer configured to optimize parameters of the generative neural network module according to the loss value of the generative neural network module.

According to an embodiment of the present disclosure, wherein the first loss function includes: a content loss function, the content loss value of the generative neural network being calculated in accordance with the content loss function and according to content features of the first training image, the first output image and the second output image.

According to an embodiment of the present disclosure, the first loss function includes: a result diversity loss function, a result diversity loss value of the generative neural network being calculated in accordance with the result diversity loss function and according to content features of the first output image and content features of the second output image.

According to an embodiment of the present disclosure, the training neural network module is further configured to train the discriminative neural network module according to the output of the discriminative neural network module, the training neural network module further includes: a second loss calculation unit configured to train the discriminative neural network module according to the discriminative tags; wherein the first output image serves as a first sample image, the discriminative neural network module obtains a second sample image from a data set, identifies whether the first sample image and the second sample image have conversion features, and outputs discriminative tags; the discriminative neural network module is trained by using the second loss calculation unit according to the discriminative tags; the second loss calculation unit comprises: a second loss calculator configured to calculate a loss value of the discriminative neural network module according to the discriminative tag of the first sample image and the discriminative tag of the second sample image and in accordance with a second loss function, the second loss function including a discriminative neural network module loss function; and an optimizer configured to optimize parameters of the discriminative neural network module according to the loss value of the discriminative neural network module.

An embodiment of the present disclosure further provides an image processing device, comprising: one or more processors; and one or more memories, wherein the memories store computer-readable codes, the image processing method as described above or the image processing apparatus as described above is implemented when the computer-readable codes are executed by the one or more processors.

BRIEF DESCRIPTION OF THE DRAWINGS

In order to more clearly illustrate the technical solutions in the embodiments of the present disclosure or in the prior art, drawings necessary for describing the embodiments or the prior art will be briefly introduced below, obviously, the below described drawings are only some embodiments of the present disclosure, for those skilled in the art, other drawings may also be obtained according to these drawings without paying creative efforts.

DETAILED DESCRIPTION OF THE EMBODIMENTS

Hereinafter, the technical solutions in the embodiments of the present disclosure will be described clearly and comprehensively in combination with the drawings thereof, obviously, these described embodiments are only parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

The neural network used in the prior art for image conversion processing is complicated, has the problem of being difficult to train, and lacks diversity between output images. Embodiments of the present disclosure provide an image processing method, a processing apparatus and a processing device for implementing image conversion processing. The image processing method, processing apparatus and processing device perform image conversion processing using a set of generative neural networks, and train the generative neural network based on content features, thereby maintaining consistency between the output image and the input image, the system is simple and easy to train. The input of the generative neural network includes channels of an input image and a noise image channel for generating image detail information, such that, according to the same input image, a different output image is generated due to the different input noise image by using the generative neural network, i.e. achieving diversity between different output images.

Figure 1:
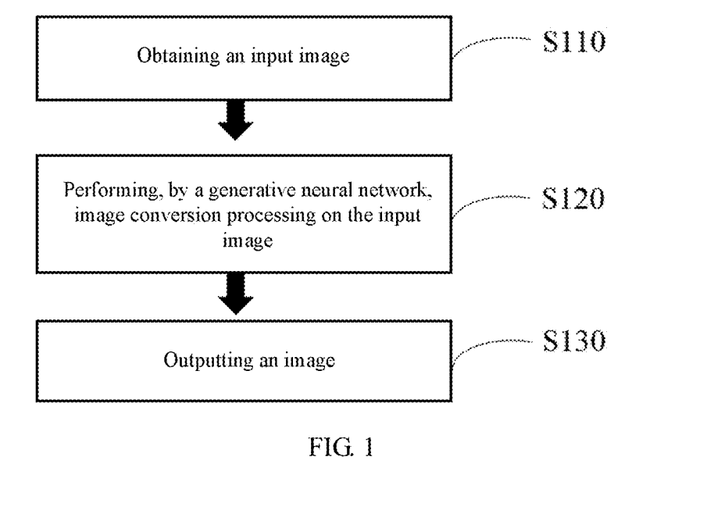
FIG. 1 shows a flowchart of an image processing method provided according to an embodiment of the present disclosure.

FIG. 1 shows a flowchart block diagram of an image processing method provided according to an embodiment of the present disclosure. In step S110, an input image to be subjected to image conversion processing is obtained, the input image has N channels (features) as raw information and N is an integer greater than or equal to 1. For example, N may be 3, specifically it includes a first color channel, a second color channel and a third color channel. In the embodiment of the present disclosure, the N channels may be RGB three channels. Next, in step S120, image conversion processing is performed on the input image by using a generative neural network, wherein the generative neural network is obtained by training based on the content loss function. The content loss function is used to calculate a content loss of the generative neural network based on content features of the input image and the output image of the generative neural network.

In the course of performing image conversion processing, the input of the generative neural network includes a channel of the noise image and N channels of the input image (RGB three channels in the embodiment of the present disclosure). The noise image may include M channels, and M is a positive integer greater than or equal to 1. For example, the noise image may include one channel, the noise image is inputted to the generative neural network together with the N channel information of the input image, for achieving diversity of the output image during the image conversion processing.

In the embodiment according to the present disclosure, the noise image may include three channels, which three channels are respectively added to the RGB three channels of the input image for respectively generating information of the output image. The noise may be random noise, such as Gaussian noise, used to generate detail information of the output image during image conversion. Since the noise image inputted every time contains random noise, multiple image processing operations performed by using the same set of generative neural networks according to the same input image may obtain output images with different detail information, resulting in diversity of conversion results.

In step S130, the generative neural network outputs an output image that has been subjected to image conversion processing, the output image has N channels. There may be RGB three channels in the embodiment of the present disclosure. The generative neural network can implement different image conversion processing through different training procedures, which may for example be image conversion of image style, scene, season, effect or image conversion based on other features.

Figure 2:
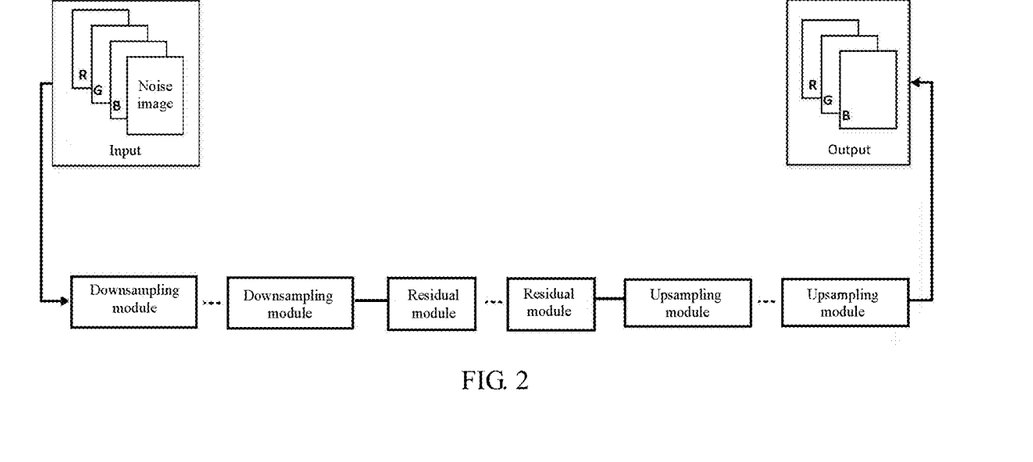
FIG. 2 shows a structural schematic diagram of a generative neural network for implementing the image processing method in FIG. 1.

FIG. 2 shows a structural schematic diagram of a generative neural network for implementing the image processing method described above. The generative neural network may include one or more downsampling modules, one or more residual modules and one or more upsampling modules. The depth of the generative neural network is decided by the number of the downsampling module, the residual module, and the downsampling module, and is determined according to a specific conversion application. In addition, the number of the downsampling module and the number of the upsampling module are equal, for ensuring that the output image has the same image size as the input image.

The downsampling module is configured to perform convolution processing on the input image and the noise image to extract image features and reduce a size of the feature images. The residual module further processes the feature image outputted by the downsampling module by means of convolution without changing the size of the feature images. The upsampling module is configured to perform amplification and normalization processing on the feature images outputted by the residual module, and output an output image that has been feature-converted. The conversion feature of the output image is determined by parameters of the generative neural network, the generative neural network is trained by using the training image according to the conversion application, so as to optimize the parameters, thus achieving the conversion purpose. For example, the parameters may include convolution kernels and biases of the convolution network in the discriminative neural network module. The image conversion application may be conversion of image style, season, effect, scene etc., for example, converting a landscape image into an image with Van Gogh works features, converting an image with summer features into an image with winter features, converting an image of brown horse to having zebra features etc., even converting an image of a cat to an image of a dog.

Figure 3:
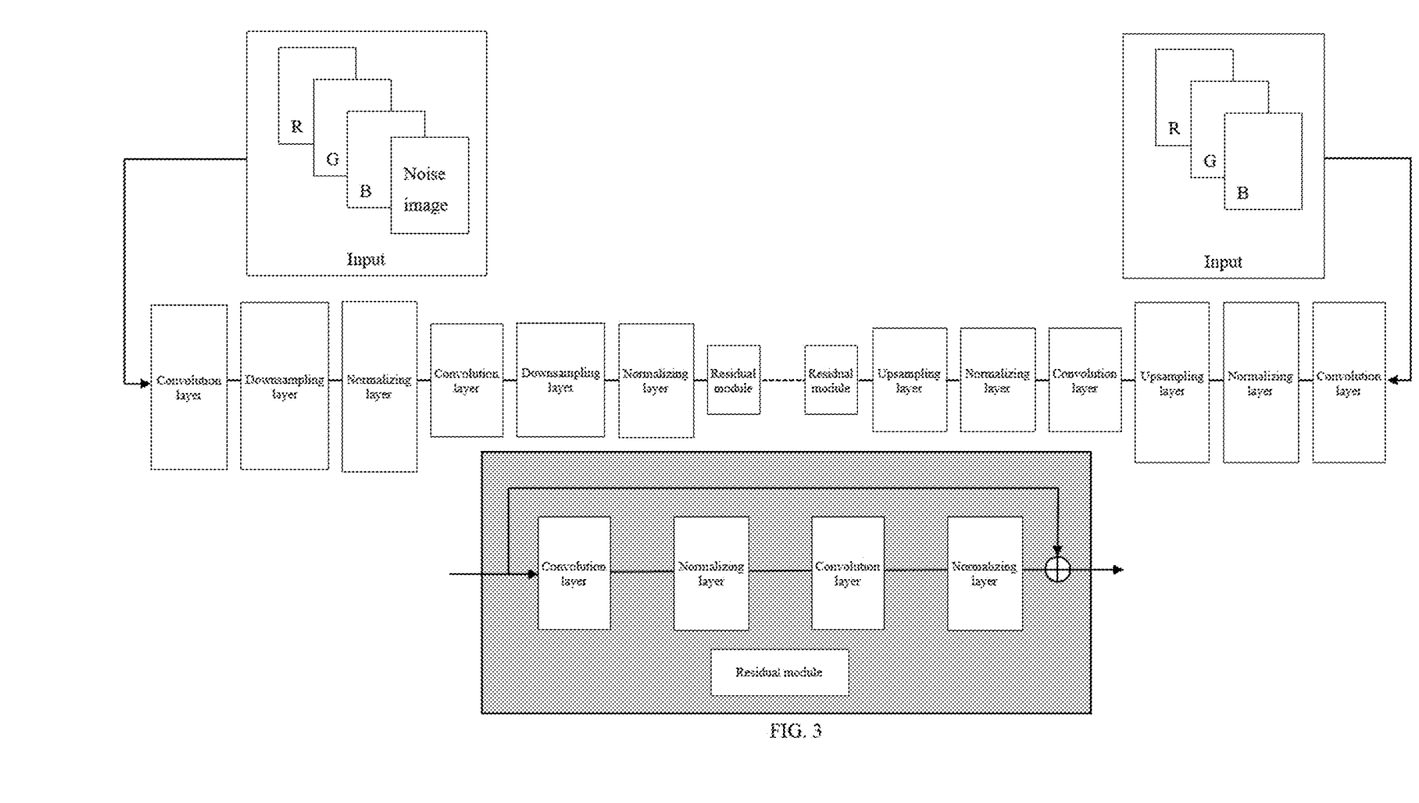
FIG. 3 shows a specific structure of the generative neural network in FIG. 2.

FIG. 3 shows a specific structure view of the generative neural network in FIG. 2. Hereinafter, a generative neural network according to an embodiment of the present disclosure will be specifically described with reference to FIGS. 2 and 3. As shown in FIG. 3, the downsampling module may include a convolution layer, a downsampling layer and an instance normalizing layer that are connected in sequence.

In the convolution layer, one neuron is only connected to neurons of parts of adjacent layers, and the convolution layer can apply a number of convolution kernels to the inputted image to extract multiple types of features. Each convolution kernel can extract one type of feature, in the process of training the generative neural network, the convolution kernels can achieve a reasonable weight by learning. The result obtained by applying a convolution kernels to the input image is referred to as a feature image, the number of which is the same as the number of convolution kernel. Each feature image consists of a number of rectangularly arranged neurons, and neurons of the same feature image share weights, i.e., convolution kernels. The feature image outputted by one convolution layer is processed by the next convolution layer to obtain a new feature image. For example, the input image can be processed by one convolution layer to obtain its content feature, and the content feature can be processed by the next convolution layer to obtain a style feature.

The downsampling layer may downsample the image (which may for example be a pooling layer), reduce a size of the feature images without changing the number of feature images, perform feature compression, and extract main features. In addition, the downsampling layer can reduce the size of the feature images to simplify the computational complexity and reduce the overfitting phenomenon to some extent.

The instance normalizing layer is for normalizing the feature image outputted by an upper level. In the embodiment of the present disclosure, the instance normalizing layer normalizes the mean and variance of each feature image. It is assumed that the number of selected feature images (mini-batch) is T, the number of features outputted by the convolution layer is C, each feature image is a matrix of H rows and W columns, the feature image is represented as (T, C, W, H), then the normalizing formula is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm}, \sigma_{ti}^2 = \frac{1}{HW}\sum_{l=1}^{W}\sum_{m=1}^{H} (x_{tilm} - m\mu_{ti})^2$$

where $x_{tijk}$ is the value in the k-th row and the j-th column of the i-th feature image of the t-th feature block (patch) in the feature image set outputted by a certain convolution layer, $y_{tijk}$ represents the result of subjecting $x_{tijk}$ to processing of the instance normalizing layer, $\varepsilon$ is an integer with a very small value to avoid the denominator being 0.

As shown in FIG. 3, the residual module may include a convolution layer and an instance normalizing layer. In addition, cross-layer connection may also be included in the residual module. As shown in FIG. 3, the cross-layer connection results in that the residual module has two portions, one portion is a processing portion having a convolution layer and an instance normalizing layer, and the other portion is a cross-layer portion that does not process the input image, the cross-layer portion superimposes the input of the residual module directly onto the output of the processing portion.

Introducing cross-layer connection in the residual module can bring greater flexibility to the generative neural network. After training of the generative neural network is completed, in a deployment phase of the system, a degree of influence caused by the processing portion and the cross-layer portion in the residual module on the image processing result can be determined. According to the degree of influence, structure of the generative neural network can be tailored to improve operating efficiency and processing rate of the network. For example, if it is determined that the effect caused by the cross-layer portion on the image processing result is much larger than that caused by the processing portion, when image processing performed by using the generative neural network, it may use only the cross-layer portion in the residual module without using the processing portion, thereby improving the overall processing efficiency of the network.

As shown in FIG. 3, the upsampling module may include an upsampling layer, an instance normalizing layer and a convolution layer that are sequentially connected, for extracting features of the input image and normalizing the feature images.

Figure 4:
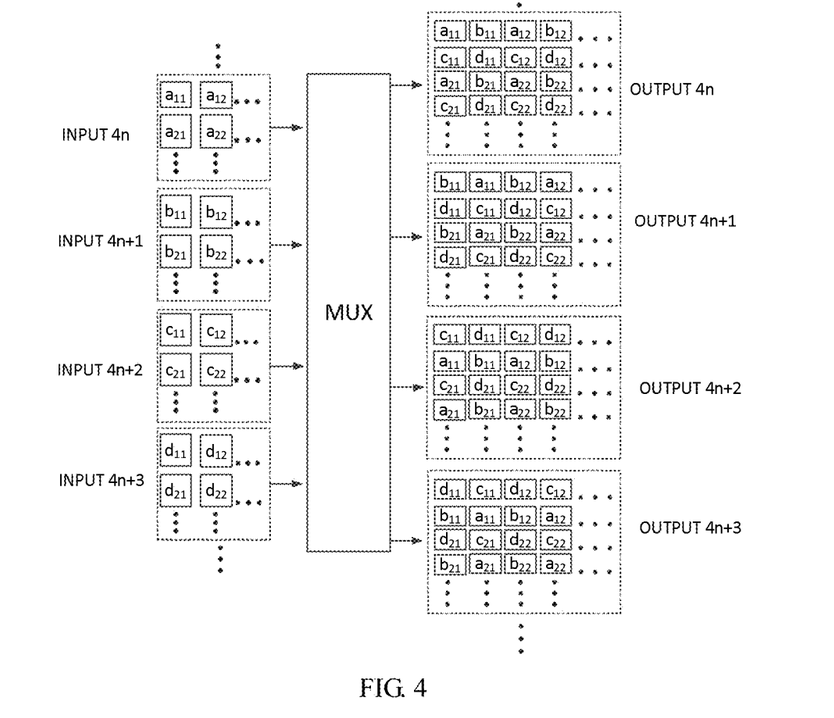
FIG. 4 shows a schematic diagram of a MUX layer.

The upsampling layer may for example be a MUX layer that can perform pixel interleaving rearrangement processing on the inputted several images, such that the size of each image is increased without changing the number of images. Thus, the MUX layer increases the number of pixels of each image by arranging and combining pixels between different images. FIG. 4 shows a schematic diagram of upsampling by using a 2*2 MUX layer. For the inputted four images INPUT 4n, INPUT 4n+1, INPUT 4n+2 and INPUT 4n+3, it is assumed that the number of pixels of the input image is a*b, after pixel rearrangement processing of the 2*2 MUX layer, four images with the pixel number of 2a*2b, OUTPUT 4n, OUTPUT 4n+1, OUTPUT 4n+2 and OUTPUT 4n+3 are outputted, pixel number for each output image is added.

In the embodiment of the present disclosure, the channel of the noise image and the N channels of the input image (RGB channels in the embodiment of the present disclosure) are together inputted into the generative neural network, the input image and the noise image pass through processing of the downsampling module, the residual module and the upsampling module as described above, the feature images thereof are extracted, and the output image having the conversion feature is outputted finally. The noise image has random noise for generating detail information in the output image, and since each inputted noise image is different, even if the same input image is inputted twice to the same generative neural network, output images with detail difference can be also obtained, this enriches detail information in the output image and achieve better image conversion effect.

Figure 5:
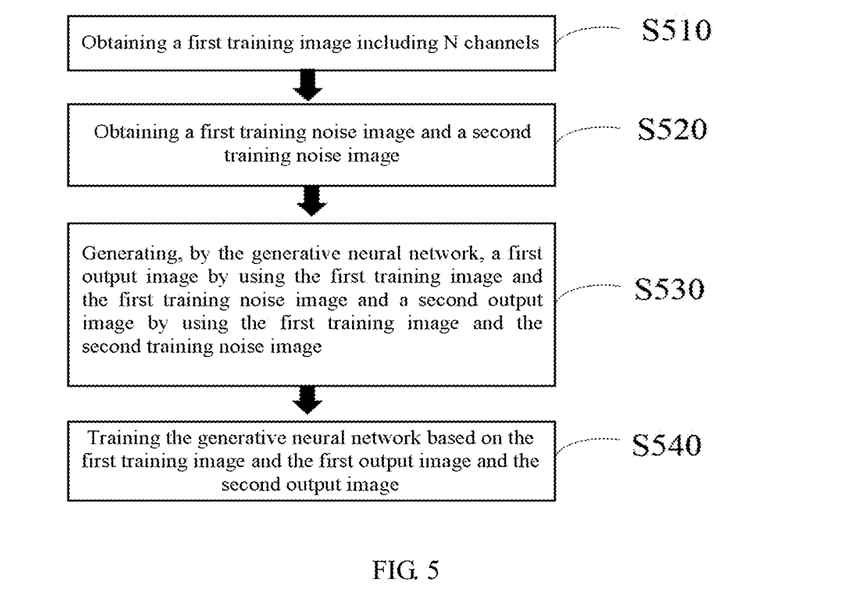
FIG. 5 shows a flow chart of training the generative neural network.
Figure 6:
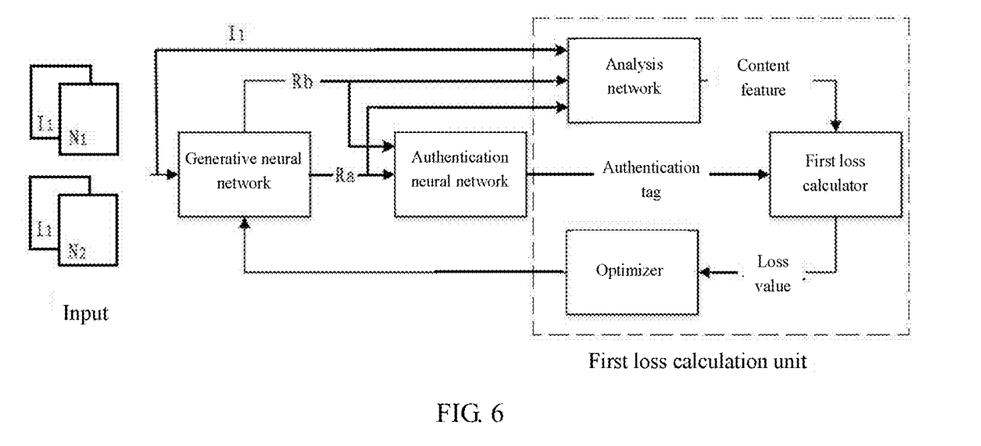
FIG. 6 shows a block diagram of training the generative neural network.

FIG. 5 shows a flow chart of training the generative neural network, FIG. 6 shows a block diagram of training the generative neural network. Hereinafter, the process of training the generative neural network will be described in detail in conjunction with FIGS. 5 and 6.

In the image processing method according to an embodiment of the present disclosure, as shown in FIG. 5, in step S510, a first training image $I_1$ including N channels is obtained, wherein the input image may serve as the first training image $I_1$.

Next, in step S520, a first training noise image $N_1$ and a second training noise image $N_2$ are obtained. The first training noise image $N_1$ and the second training noise image $N_2$ are different, wherein the training noise images $N_1$ and $N_2$ may include M channels respectively, and M is a positive integer greater than or equal to 1, for example, in the embodiment of the present disclosure, M may be 1. The training noise image is inputted to the generative neural network along with the first training image, for generating image detail information during the image conversion process. In other embodiments according to the present disclosure, M may also be 3, information of 3 channels of the noise image is added to the RGB three channels of the first training image $I_1$ respectively, then the first training image $I_1$ into which the noise image is introduced is inputted to the generative neural network for image conversion processing.

Thereafter, in step S530, the generative neural network generates a first output image Ra by using the first training image $I_1$ and the first training noise image $N_1$, and generates a second output image Rb by using the first training image $I_1$ and the second training noise image $N_2$. The flow of converting the input image according to the input image and the noise image by using the generative neural network to obtain the output image is the same as the flow shown in FIG. 1, details will not be described herein.

Thereafter, in step S540, the generative neural network is trained based on the first training image $I_1$ and the first output image Ra and the second output image Rb. The training aims to optimize parameters in the network according to the processing result of the generative neural network, so that the effect of image conversion processing can be achieved.

As shown in FIG. 6, the specific process of training the neural network in step S540 comprises: inputting the first output image Ra to a discriminative neural network, and outputting a discriminative tag for whether the first output image Ra has a conversion feature; and calculating a loss value of the generative neural network according to the first training image $I_1$, the first training output image Ra, the second output image Rb and the discriminative tag and optimizing parameters of the generative neural network, by using a first loss calculation unit. According to an embodiment of the present disclosure, the first output image Ra and the second output image Rb may also be inputted together into the discriminative neural network, discriminative tags are outputted respectively, and used for training the generative neural network.

Figure 7:
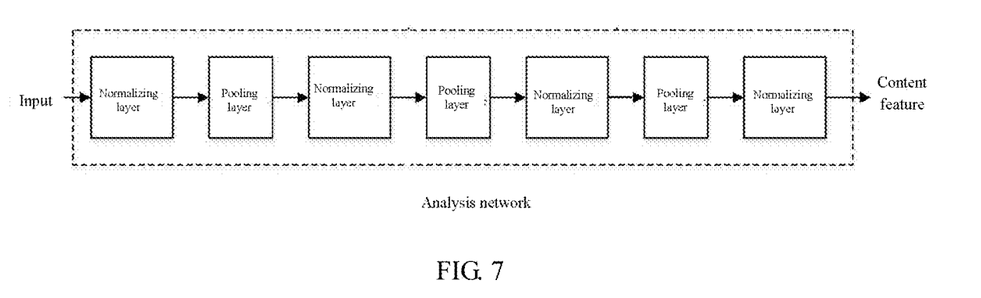
FIG. 7 shows a specific structural diagram of an analysis network.

As shown in FIG. 6, the first loss calculation unit includes an analysis network, a first loss calculator and an optimizer. The specific structure of the analysis network is as shown in FIG. 7, which is composed of several convolution networks and a pooling layer, and used for extracting content features of the input image. The output of each convolution network is a feature extracted from the input image, and the pooling layer is used to reduce the pixel number of the feature image and pass it to the next convolution network. The feature image processed by each convolution network characterizes the feature (such as texture, edge, object etc.) of the input image at different levels. In the embodiment of the present disclosure, the first training image $I_1$, the first output image Ra and the second output image Rb are processed by using the analysis network, the content features thereof are extracted, and the extracted content features are inputted to the first loss calculator.

As shown in FIG. 6, the first loss calculator calculates a loss value of the generative neural network according to the content features of the first training image $I_1$ and the first output image Ra and the second output image Rb and the discriminative tag outputted by the discriminative neural network, and in accordance with a first loss function. The first loss calculator inputs a calculated total loss value of the generative neural network to the optimizer, the optimizer optimizes convolution kernels and biases of the convolution layer in the generative neural network according to the loss value, so as to achieve a desired image conversion effect.

In the embodiment of the present disclosure, the first loss calculation function may include a content loss function, for example, let $I_1$ be the input image, Ra be the first output image, $P^l$ and $F^l$ be the feature images of $I_1$ and Ra outputted from the l-th level in the analysis network, definition of the content loss function is as follows:

$$L_{content} = \frac{1}{2C1} \sum_{ij} (F_{ij}^l - P_{ij}^l)^2$$

where C1 is a constant used to perform normalization processing, $F_{ij}^l$ represents the value of the j-th position in $F^l$ outputted by the i-th convolution kernel in the l-th convolution layer in the analysis network, $P_{ij}^l$ represents the value of the j-th position in $P^l$ outputted by the i-th convolution kernel in the l-th convolution layer.

By the formula of the content loss function, the content loss values $L_{content\_a}$ and $L_{content\_b}$ of the first output image Ra and the second output image Rb processed by the generative neural network relative to the first training image can be calculated according to the contents features outputted for the first training image $I_1$, the first output image Ra and the second output image Rb outputted by the analysis network.

By calculating the content loss value of the generative neural network, it can be ensured that the output image outputted thereby is consistent with the input image, so that the output image after the image conversion retains raw information of the input image on the basis of having the conversion feature, thus the problem of big difference between the input image and the output image is avoided.

In the embodiment of the present disclosure, the generative neural network is trained by using the discriminative neural network and combined with the content loss function, so as to ensure consistency between the output image and the input image, so that the system is simple and easy to train.

In the embodiment of the present disclosure, the first loss calculation function may further include a result diversity loss function, for calculating a result diversity loss value of the generative neural network according to content features of the first output image Ra and content features of the second output image Rb. By using the generative neural network, the first output image Ra is obtained according to the first training image $I_1$ and the first training noise $N_1$, and the second output image Rb is obtained according to the first training image $I_1$ and the second training noise $N_2$, in accordance with the content loss function, a content difference between Ra and Rb should be:

$$L_{RaRb} = \frac{1}{2C1} \sum_{ij} (R_{aij}^l - R_{bij}^l)^2$$

In order to make sure that the output images have diversity, that is, the generative neural network can output the output images with different variability for the same input image, it is expected that a content loss between the two output results Ra and Rb is the larger the better, and thus the result diversity loss function is:

$$L_{DVST} = \frac{1}{L_{RaRb}} = \frac{2C2}{\sum_{ij}(R_{aij}^l - R_{bij}^l)^2}$$

where C2 is a constant for performing normalization processing. The first loss calculator calculates a result diversity loss value of the generative neural network in accordance with the result diversity loss function and based on the content features of the first output image Ra and the second output image Rb outputted by the analysis network.

In an embodiment of the present disclosure, the first loss calculation function may further comprise a loss function of the genitive neural network:

$$L\_G = E_{x \sim P_{data}(x)}[\log D(x)] + E_{z \sim P_z(z)}[1 - \log D(G(z))]$$

where Pdata is a set of images that cause output of the discriminative neural network to be 1; Pz is a set of input images of the generative neural network; D is the discriminative neural network, G is the generative neural network. The first loss calculator generates a confrontation loss value of the neural network based on the L_G.

In the embodiment of the present disclosure, the first loss calculation function may further comprise a parameter regularizing loss function $L_{L1}$. In the neural network, parameters of the convolution kernels and the biases need to be obtained by training. The convolution kernels determine how the inputted image is processed, and the bias determines whether the output of the convolution kernel is to be inputted to the next layer. Thus, in the neural network, the bias can be visually compared to a "switch" that determines the convolution kernel is "on" or "off". For different input images, the network may turn on or off different convolution kernels to achieve different processing effects.

The mean value of the absolute values of all convolution kernels in the neural network is:

$$W = \frac{\sum \|w\|}{C_w}$$

where $C_w$ is the number of convolution kernels in the network. The mean value of absolute values of all biases in the neural network is:

$$B = \frac{\sum \|b\|}{C_b}$$

where $C_b$ is the number of biases in the network.

The parameter regularizing loss function is:

$$L_{L1} = \frac{W}{B + \varepsilon}$$

where ε is a very small positive number used to ensure that the denominator is not zero.

In the embodiment of the present disclosure, it is desired that the biases in the convolution layer have a greater absolute value than the convolution kernels, so as to more effectively achieve the "switch" function of the biases. During the training, the first loss calculator calculates a parameter regularizing loss value of the generative neural network according to the $L_{L1}$.

In summary, a total loss of the generative neural network is:

$$L_{total} = \alpha L_{content} + \beta L\_G + \chi L_{DVST} + \delta R$$

where R is the normalizing loss value of the generative neural network, and α, β, χ and δ are weights occupied respectively by the content loss value, the confrontation loss value, the result diversity loss value and the normalizing loss value in the total loss, in the embodiment of the present disclosure, the parameter regularizing loss value described above is used to represent the normalizing loss value, other types of normalizing loss values may also be used.

Figure 8:
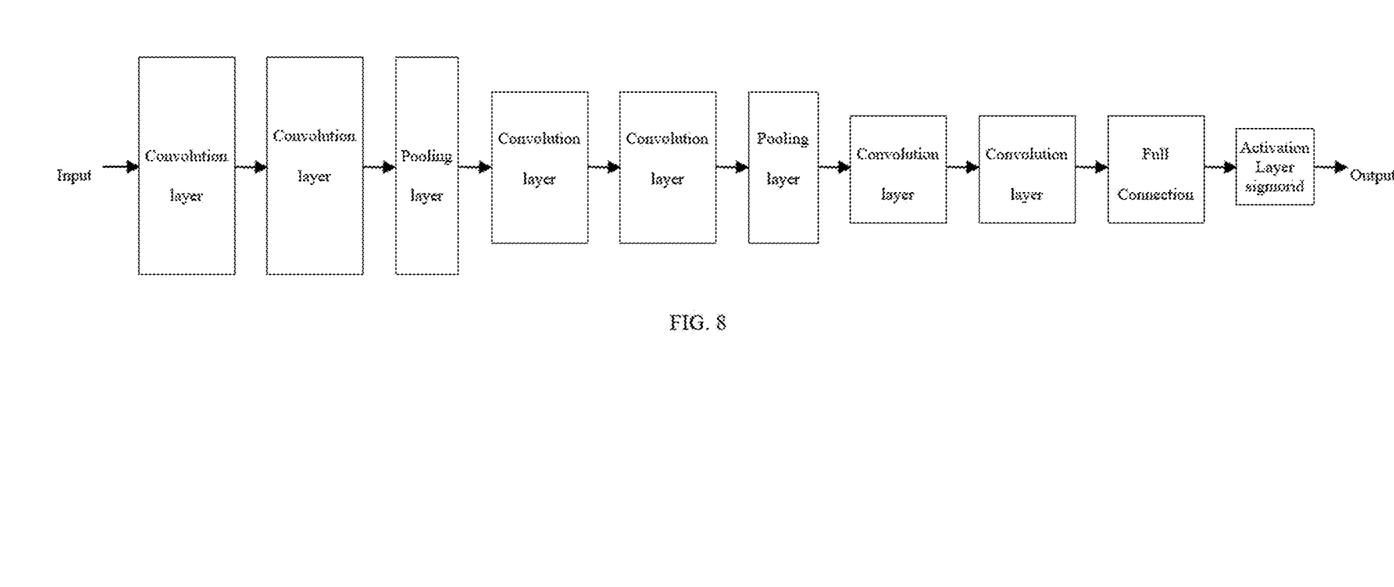
FIG. 8 shows a specific structural diagram of a discriminative neural network.

The generative neural network together with the discriminative neural network used in the process of training the generative neural network constitute a set of confrontation networks. The discriminative neural network extracts content features of the input image by using a number of convolution layers and the pooling layer, and reduces the size of the feature images, for further extraction of image features by the next convolution layer. The image features are then processed using the full connection layer and the activation layer, and finally a scalar value of a discriminative tag indicating whether the input image has a conversion feature is outputted. The full connection layer has the same structure as the convolution neural network except that the convolution kernels are replaced with the scalar values. The activation layer is typically a RELU or sigmoid function. In the embodiment of the present disclosure, the specific structure of the discriminative neural network for outputting the discriminative tag is as shown in FIG. 8, wherein the activation layer is a sigmoid function.

In the confrontation network, the generative neural network converts the input image having an effect A into an output image having an effect B, the discriminative neural network determines whether the output image has the feature of the effect B and outputs a discriminative tag. For example, if it is determined that the output image has the feature of the effect B, then the output is close to "1", and if it is determined that the output image does not have the feature of the effect B, then "0" is outputted. Through training, the generative neural network gradually generates an output image that causes the discriminative neural network to output "1", and gradually the discriminative neural network can more accurately determine whether the output image has a conversion feature. The two are trained synchronously and confront against each other to obtain better parameters.

Figure 9:
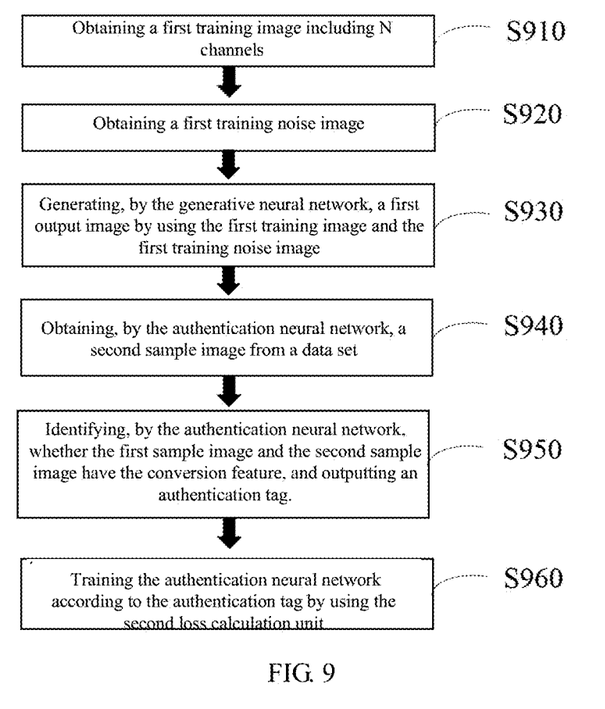
FIG. 9 shows a flow chart of training the discriminative neural network.
Figure 10:
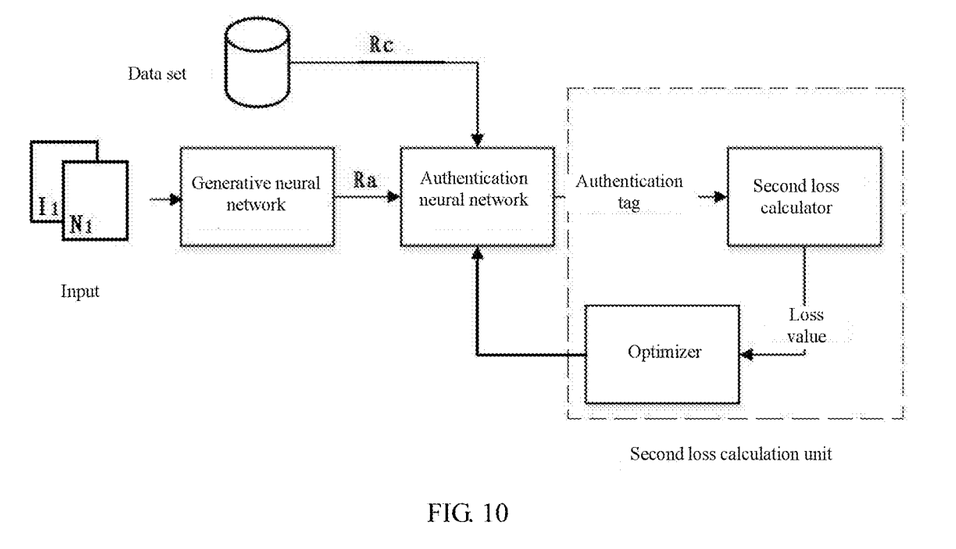
FIG. 10 shows a block diagram of training the discriminative neural network.

FIG. 9 shows a flow chart of training the discriminative neural network, FIG. 10 shows a block diagram of training the discriminative neural network. Next, the process of training the discriminative neural network will be described in detail with reference to FIGS. 9 and 10.

As shown in FIG. 9, in step S910, a first training image $I_1$ including N channels is obtained, wherein the first training image may be the same as or different from the first training image used for training the generative neural network, both of which are used as the input image used for training the neural network. In step S920, a first training noise image $N_1$ is acquired, and then in step S930, the generative neural network generates a first output image by using the first training image $I_1$ and the first training noise image $N_1$, this first output image is called the first sample image Ra. The flow of performing the conversion processing by using the generative neural network according to the first training image $I_1$ and the first training noise image $N_1$ to output the first output image is the same as the flow shown in FIG. 1, and details will not be repeated herein again.

Next, in step S940, the discriminative neural network obtains a second sample image Rc from a data set. In step S950, the discriminative neural network is used to identify whether the first sample image Ra and the second sample image Rc have the conversion feature, and output discriminative tags respectively. It should be understood that the second sample image Rc has a "true" tag naturally, and the first sample image Ra naturally has a "fake" tag. Last, in step S960, the discriminative neural network is trained according to the discriminative tags by using the second loss calculation unit.

As shown in FIG. 10, the second loss calculation unit may include a second loss calculator and an optimizer. In the image processing method, training the discriminative neural network by using the second loss calculation unit comprises: calculating, by using the second loss calculator, a loss value of the discriminative neural network according to the discriminative tag of the first sample image and the discriminative tag of the second sample image and in accordance with a second loss function, wherein the second loss function may include a discriminative neural network loss function; the optimizer is used to optimize parameters of the discriminative neural network according to the loss value of the discriminative neural network. For example, the parameters may include convolution kernels and biases of the convolution layer in the discriminative neural network.

The first sample image Ra is an output image obtained by converting the effect A to the effect B by using the generative neural network, and is equivalent to a "false" sample. The second sample image Rc obtained from the training database is a "true" sample with the effect B. The discriminative neural network is used to determine whether the Ra and Rc have the effect B, and output discriminative tags respectively.

The discriminative neural network loss function included by the second loss function is:

$$L\_D = -E_{x\sim Pdata(x)}[\log D(x)] - E_{z\sim Pz(z)}[1-\log D(G(z))]$$

where Pdata is a set of images that cause output of the discriminative neural network to be 1; Pz is a set of input images of the generative neural network; D is the discriminative neural network, G is the generative neural network. A loss value of the discriminative neural network is calculated by the second loss calculator based on the L_G, and parameters of the discriminative neural network are optimized according to the loss value by using the optimizer.

In the image processing method provided by the embodiment of the present disclosure, the noise image and the input image are inputted together to the generative neural network. In the process of performing image conversion processing, the noise image may generate image detail information such that the output converted images have diversity, that is, due to the different input noise, the output images for the same input image may also have difference.

The trained generative neural network has optimized parameters that can be used to implement a desired image conversion processing. In addition, in the present disclosure, training is carried out by using the first loss calculation unit and in combination with the content features of the input image, the first output image and the second output image, the system is simple and easier to train, wherein the result diversity loss function is used to retain diversity between output images outputted by the generative neural network. The content loss function is used to achieve consistency between the output image and the input image, that is, the output image after being converted has both the conversion feature and sufficient raw image information, so as to avoid losing a lot of raw image information during image processing.

Figure 11:
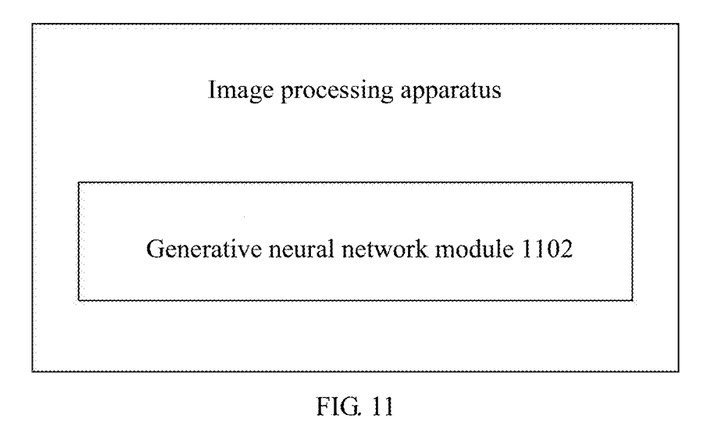
FIG. 11 shows a schematic block diagram of an image processing apparatus provided according to an embodiment of the present disclosure.

An embodiment according to the present disclosure also provides an image processing apparatus that can implement the image processing method described above. A schematic block diagram of the image processing apparatus is shown in FIG. 11, which includes a generative neural network module 1102. The generative neural network module may comprise the generative neural network as described above. The image processing apparatus provided according to the embodiment of the present disclosure performs image conversion processing on the input image and the noise image by using the generative neural network module to output the converted output image. In addition, the image processing apparatus may further comprise a training neural network module (not shown), configured to train the generative neural network module based on the output image of the generative neural network module.

The input image may include N channels, N is an integer greater than or equal to 1. The input of the generative neural network includes a channel of the noise image and N channels of the input image. The output of the generative neural network is an output image having N channels. For example, N may be 3, the input image includes a first color channel, a second color channel and a third color channel. In the embodiment of the present disclosure, there are RGB three channels. The noise image channels may include M channels, M is a positive integer greater than or equal to 1. For example, in the embodiment of the present disclosure, M may be 1, the noise image is inputted to the generative neural network along with the input image, for generating image detail information during the image conversion process. In other embodiments according to the present disclosure, M may also be 3, 3 channels of the noise image may be added to the RGB three channels of the input image respectively, and the input image into which the noise image is introduced is then inputted to the generative neural network for image conversion processing.

The generative neural network may include one or more downsampling modules, one or more residual modules and one or more upsampling modules. The downsampling module may include a convolution layer, a downsampling layer and an instance normalizing layer that are connected in sequence. The residual module may include a convolution layer and an instance normalizing layer that are connected in sequence. The upsampling module may include an upsampling layer, an instance normalizing layer and a convolution layer that are connected in sequence. In addition, the number of the upsampling module is equal to the number of the downsampling module.

In the embodiment of the present disclosure, the generative neural network module performs image conversion using the first training image $I_1$ and the first training noise image $N_1$ to output the first output image Ra that has been subjected to image conversion processing, and performs image conversion using the first training image $I_1$ and the second training noise image $N_2$ to output the second output image Rb that has been subjected to image conversion processing.

The generative neural network module is trained by the training neural network module based on the first training image $I_1$ and the first output image Ra and the second output image Rb. The training aims to optimize parameters in the network according to the processing result of the generative neural network module, so that a desired image conversion effect can be achieved.

The training neural network module may comprise: a discriminative neural network module configured to output a discriminative tag for whether the first output image Ra has a conversion feature; and a first loss calculation unit configured to calculate a loss value of the generative neural network module according to the first training image $I_1$, the first output image Ra, the second output image Rb and the discriminative tag, and optimize parameters of the generative neural network module. In the embodiment of the present disclosure, the first output image Ra and the second output image Rb may also be together inputted to the discriminative neural network, and the discriminative tags are respectively outputted, and used together to train the generative neural network.

According to an embodiment of the present disclosure, the training neural network module is further configured to train the discriminative neural network module according to the output of the discriminative neural network module, the training neural network module further comprises: a second loss calculation unit, configured to train the discriminative neural network module according to the discriminative tags.

In the embodiment of the present disclosure, the generative neural network module performs image conversion processing using the first training image $I_1$ and the first training noise image $N_1$ to output the converted first output image, which may be used as the first sample image Ra, the discriminative neural network module obtains a second sample image Rc from a data set, and identifies whether the first sample image Ra and the second sample image Rc have a conversion feature, and outputs the discriminative tags respectively; next, the second loss calculation unit trains the discriminative neural network module according to the discriminative tags. This parameter optimization is intended to enable the discriminative neural network module to output a more accurate discriminative tag.

The second loss calculation unit includes: a second loss calculator configured to calculate a loss value of the discriminative neural network module according to the discriminative tag of the first sample image Ra and the discriminative tag of the second sample image Rc and in accordance with a second loss function, wherein the second loss function is a loss function of the discriminative neural network module; and an optimizer configured to optimize parameters of the discriminative neural network based on the loss value of the discriminative neural network module. For example, the parameters include convolution kernels and biases of the convolution network in the discriminative neural network module.

The trained generative neural network module can perform an expected image conversion processing based on the training, so as to generate an output image capable of causing the output of the discriminative neural network module to be "1", that is, the discriminative neural network module determines that the output image has the conversion feature. The trained discriminative neural network module can, by means of training, more accurately determine whether the output image outputted by the generative neural network module has the conversion feature.

The image processing apparatus provided according to the embodiment of the present disclosure includes a generative neural network module, in the image processing process, the noise image and the input image are inputted together to the generative neural network module, and the noise image can generate image detail information so that there is diversity between the output images.

The trained generative neural network module has optimized parameters that can be used to implement a desired image conversion processing. In the present disclosure, training is carried out by using the first loss calculation unit and in combination with the content features of the input image, the first output image and the second output image, the system is simple and easier to train, wherein the result diversity loss function ensures diversity between output images outputted by the generative neural network. The content loss function is used to achieve consistency between the converted image and the input image, that is, the converted image has both the conversion feature and sufficient raw image information, so as to avoid losing a lot of raw image information during image processing.

Figure 12:
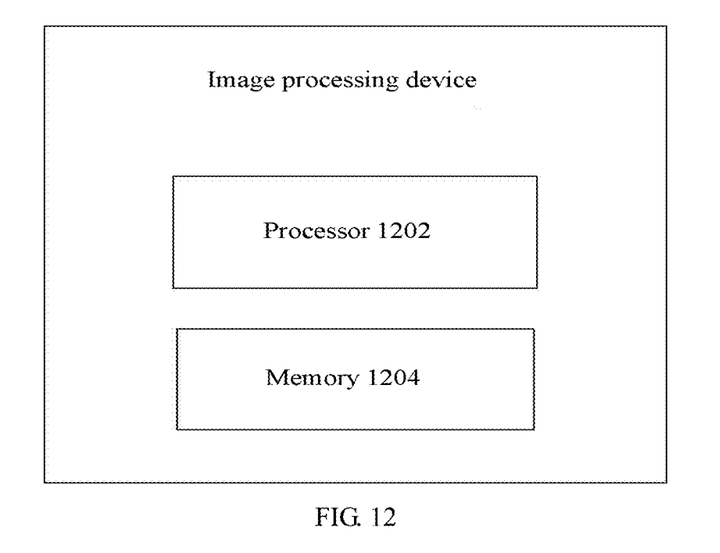
FIG. 12 shows a schematic block diagram of an image processing device provided according to an embodiment of the present disclosure.

An embodiment of the present disclosure further provides an image processing device, whose structural block diagram is shown in FIG. 12, it includes a processor 1202 and a memory 1204. It should be noted that structure of the image processing device shown in FIG. 12 is merely exemplary and not restrictive, the image processing device may have other components depending on actual application needs.

In an embodiment of the present disclosure, the processor 1202 and the memory 1204 can communicate with each other directly or indirectly. Communication between components such as the processor 1202 and the memory 1204 can be made through a network connection. The network may include a wireless network, a wired network, and/or any combination of a wireless network and a wired network. The network may include a local area network, the Internet, a telecommunications network, an Internet of Things based on Internet and/or telecommunications network, and/or any combination of the above networks, and the like. The wired network can communicate by means of for example twisted pair, coaxial cable or optical fiber transmission, the wireless communication network may for example adopt 3G/4G/5G mobile communication network, Bluetooth, Zigbee or WiFi. The present disclosure does not limit the type and function of the network.

The processor 1202 can control other components in the image processing device to perform the desired functions. The processor 1202 may be devices having data processing capability and/or program execution capability, such as a central processing unit (CPU), a tensor processing unit (TPU) or a graphics processor GPU etc. The central processing unit (CPU) may be an X86 or ARM architecture or the like. The GPU may be integrated directly into the motherboard or built into the Northbridge of the motherboard. The GPU may also be built into the central processing unit (CPU), because the GPU has powerful image processing capability.

The memory 1204 may include any combination of one or more computer program products, which can include various forms of computer-readable storage medium, such as volatile memory and/or nonvolatile memory. The volatile memory may for example include random access memory (RAM) and/or caches and the like. The non-volatile memory may for example include read only memory (ROM), hard disk, erasable programmable read only memory (EPROM), portable compact disk read only memory (CD-ROM), USB memory, flash memory, and the like.

One or more computer-readable codes or instructions may be stored on the memory 1204, and the processor 1202 can execute the computer instructions to perform the image processing method described above or to implement the image processing apparatus described above. For detailed description of the image processing method and the image processing apparatus, reference may be made to the related description of the image processing method and the processing apparatus in this specification, and details will not be repeated herein. Various applications and various data may also be stored in the computer-readable storage medium, such as image data sets and various data (such as training data) used and/or generated by the applications.

Embodiments of the present disclosure provide an image processing method, a processing apparatus and a processing device for implementing image conversion processing. The image processing method, the processing apparatus and the processing device perform image conversion processing using a set of generative neural networks, and train the generative neural network based on the discriminative network and the content features, thereby ensuring consistency between the output image after the conversion processing and the input image, and the system is simple and the easy to train. The input of the generative neural network includes channels of an input image and a noise image channel for generating image detail information, such that, according to the same input image, a different output images are generated due to the different input noise images by using the generative neural network, i.e. the results have diversity. The content feature loss function is used to train the generative neural network, so as to ensure content consistency between the converted output image and the input image; the result diversity loss function between the results is used to train the generative neural network, so as to ensure diversity between the output results.

The above is only specific implementations of the present disclosure, but the protection scope of the present disclosure is not limited thereto, the protection scope of the present disclosure should be determined by the scope of the claims.

What is claimed is:

1. An image processing method, comprising:
    obtaining an input image;
    performing image conversion processing on the input image by a generative neural network; and
    outputting an output image that has been subjected to image conversion processing,
    wherein the generative neural network is obtained by training based on a content loss function,
    wherein the input image serves as a first training image, and the output image serves as a first output image, the image processing method further comprises:
    obtaining a second training noise image;
    generating, by the generative neural network, a second output image according to the first training image and the second training noise image; and
    training the generative neural network based on the first training image, the first output image and the second output image.

2. The image processing method according to claim 1, wherein
    the input image has N channels, N being a positive integer greater than or equal to 1;
    input of the generative neural network includes a noise image channel and N channels of the input image;
    output of the generative neural network is an output image including N channels.

3. The image processing method according to claim 1, wherein the generative neural network includes one or more downsampling modules, one or more residual modules and one or more upsampling modules.

4. The image processing method according to claim 3, wherein
    the downsampling module includes a convolution layer, a downsampling layer and an instance normalizing layer that are connected in sequence;
    the residual module includes a convolution layer and an instance normalizing layer that are connected in sequence;
    the upsampling module includes an upsampling layer, an instance normalizing layer and a convolution layer that are connected in sequence, wherein the number of the upsampling module is equal to the number of the downsampling module.

5. The image processing method according to claim 1, wherein training the generative neural network comprises:
    inputting the first output image to a discriminative neural network, for outputting a discriminative tag for whether the first output image has a conversion feature; and
    calculating, by using a first loss calculation unit, a loss value of the generative neural network according to the first training image, the first output image, the second output image and the discriminative tag, and optimizing parameters of the generative neural network.

6. The image processing method according to claim 5, wherein the first loss calculation unit includes an analysis network, a first loss calculator and an optimizer, and calculating, by using a first loss calculation unit, a loss value of the generative neural network comprises:
    outputting, by using the analysis network, content features of the first training image, the first output image and the second output image;
    calculating, by using the first loss calculator, the loss value of the generative neural network in accordance with a first loss function and according to content features outputted by the analysis network and the discriminative tag of the first output image; and
    optimizing, by using the optimizer, parameters of the generative neural network based on the loss value of the generative neural network.

7. The image processing method according to claim 6, wherein
    the first loss function includes a content loss function, and calculating the loss value of the generative neural network comprises: calculating, by using the first loss calculator, a content loss value of the generative neural network in accordance with the content loss function and according to content features of the first training image, the first output image and the second output image.

8. The image processing method according to claim 6, wherein
    the first loss function further includes a result diversity loss function, and calculating the loss value of the generative neural network comprises: calculating, by using the first loss calculator, a result diversity loss value of the generative neural network in accordance with the result diversity loss function and according to content features of the first output image and content features of the second output image.

9. The image processing method according to claim 5, wherein the first output image serves as a first sample image, and the image processing method further comprises:
    obtaining a second sample image from a data set;
    determining, by using the discriminative neural network, whether the first sample image and the second sample image have conversion features, and outputting discriminative tags;
    training, by using a second loss calculation unit, the discriminative neural network according to the discriminative tags,
    wherein the second loss calculation unit includes a second loss calculator and an optimizer, and training the discriminative neural network by using the second loss calculation unit comprises:
    calculating, by using the second loss calculator, a loss value of the discriminative neural network according to the discriminative tag of the first sample image and the discriminative tag of the second sample image and in accordance with a second loss function, the second loss function including a discriminative neural network loss function; and optimizing, by using the optimizer, parameters of the discriminative neural network according to the loss value of the discriminative neural network.

10. An image processing device, comprising:
one or more processors; and
one or more memories,
wherein the memories store computer-readable codes,
the computer-readable codes, when executed by the one or more processors, implements an image processing method, the method comprises:
obtaining an input image;
performing image conversion processing on the input image by a generative neural network; and
outputting an output image that has been subjected to image conversion processing,
wherein the generative neural network is obtained by training based on a content loss function,
wherein the input image serves as a first training image, and the output image serves as a first output image, the image processing method further comprises:
obtaining a second training noise image;
generating, by the generative neural network, a second output image according to the first training image and the second training noise image; and
training the generative neural network based on the first training image, the first output image and the second output image.

11. The image processing device of claim 10, wherein the input image has N channels, N being a positive integer greater than or equal to 1;
input of the generative neural network includes a noise image channel and N channels of the input image; and
output of the generative neural network is an output image including N channels.

12. The image processing device of claim 10, wherein the generative neural network includes one or more downsampling modules, one or more residual modules and one or more upsampling modules.

13. The image processing device of claim 12, wherein the downsampling module includes a convolution layer, a downsampling layer and an instance normalizing layer that are connected in sequence;
the residual module includes a convolution layer and an instance normalizing layer that are connected in sequence;
the upsampling module includes an upsampling layer, an instance normalizing layer and a convolution layer that are connected in sequence, wherein
the number of the upsampling module is equal to the number of the downsampling module.

14. The image processing device of claim 10, wherein training the generative neural network comprises:
inputting the first output image to a discriminative neural network, for outputting a discriminative tag for whether the first output image has a conversion feature; and
calculating, by using a first loss calculation unit, a loss value of the generative neural network according to the first training image, the first output image, the second output image and the discriminative tag, and optimizing parameters of the generative neural network.

15. The image processing device of claim 14, wherein the first loss calculation unit includes an analysis network, a first loss calculator and an optimizer, and calculating, by a first loss calculation unit, a loss value of the generative neural network comprises:
outputting, by using the analysis network, content features of the first training image, the first output image and the second output image;
calculating, by using the first loss calculator, the loss value of the generative neural network in accordance with a first loss function and according to content features outputted by the analysis network and the discriminative tag of the first output image; and
optimizing, by using the optimizer, parameters of the generative neural network based on the loss value of the generative neural network.

16. The image processing device of claim 15, wherein
the first loss function includes a content loss function, and calculating the loss value of the generative neural network comprises: calculating, by using the first loss calculator, a content loss value of the generative neural network in accordance with the content loss function and according to content features of the first training image, the first output image and the second output image.

17. The image processing device of claim 15, wherein
the first loss function further includes a result diversity loss function, and calculating the loss value of the generative neural network comprises: calculating, by using the first loss calculator, a result diversity loss value of the generative neural network in accordance with the result diversity loss function and according to content features of the first output image and content features of the second output image.

18. The image processing device of claim 14, wherein
the first output image serves as a first sample image, and the image processing method further comprises:
obtaining a second sample image from a data set;
determining, by using the discriminative neural network, whether the first sample image and the second sample image have conversion features, and outputting discriminative tags;
training, by using a second loss calculation unit, the discriminative neural network according to the discriminative tags,
wherein the second loss calculation unit includes a second loss calculator and an optimizer, and training the discriminative neural network by using the second loss calculation unit comprises:
calculating, by using the second loss calculator, a loss value of the discriminative neural network according to the discriminative tag of the first sample image and the discriminative tag of the second sample image and in accordance with a second loss function, the second loss function including a discriminative neural network loss function; and
optimizing, by using the optimizer, parameters of the discriminative neural network according to the loss value of the discriminative neural network.

* * * * *